May 30, 1944. A. S. WOLFNER 2,350,006
PROCESS AND APPARATUS FOR CONTROLLING FRACTIONATIONS
Filed Feb. 27, 1941
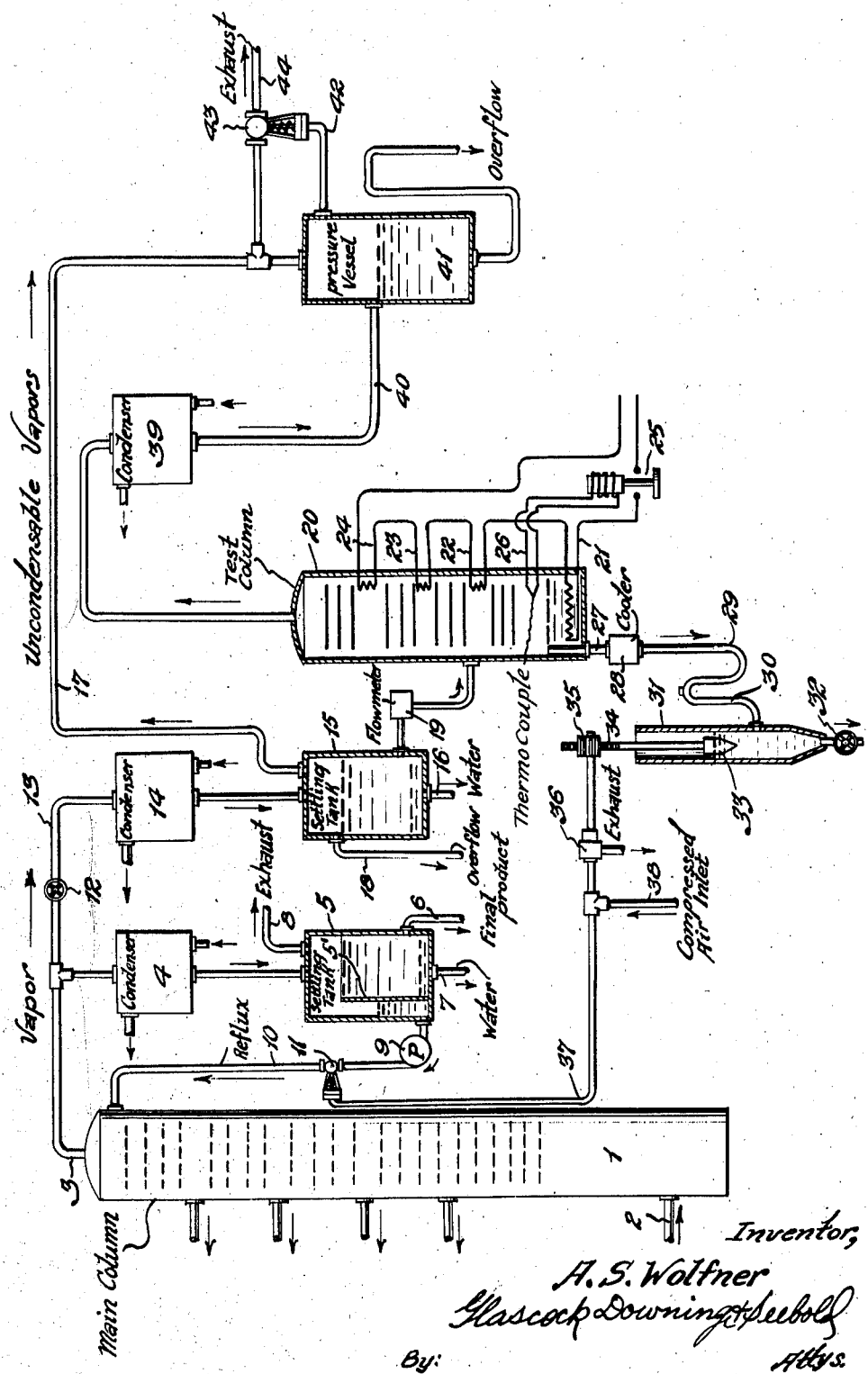
Inventor,
A. S. Wolfner
Glascock Downing & Seebold
By: Attys.

Patented May 30, 1944

2,350,006

UNITED STATES PATENT OFFICE 2,350,006

PROCESS AND APPARATUS FOR CONTROLLING FRACTIONATION

Alfred Samuel Wolfner, Paris, France; vested in the Alien Property Custodian

Application February 27, 1941, Serial No. 380,914
In France February 20, 1937

6 Claims. (Cl. 196—141)

The present application is a continuation-in-part of application Serial Number 187,089, filed January 26, 1938.

The present invention relates to a process and apparatus for continuously controlling certain characteristics and properties of the products of a fractionation column. While the process may be used in connection with the fractional distillation of any liquid mixture it is particularly suitable for controlling the fractionation of petroleum products and mineral oils. During the distillation of oil it is usual to reflux part of a fraction in order to obtain a more definite boiling point range and consequently a purer product. By controlling the quantity of reflux it is possible to control the temperature of the fraction and various characteristics of the product. It is known, for instance, to test distill a small quantity of the distillate from the main fractionation column for the purpose of determining the final boiling point of the distillate. Variations in this boiling point may be used to increase or decrease the reflux and so control the final boiling point of the product. Also various other methods and devices have been proposed for controlling different characteristics and properties of liquid mixtures produced by distillation.

The object of the present invention is to provide a method and apparatus for controlling the quantity of the various components of the desired product. In the case of gasoline, for instance, definite specifications must be complied with. For example, it may be required that 10% of the gasoline should vaporize at a given fixed temperature between 30° C. and 60° C., 40% between 60° and 120° C., 40% between 120° and 180° C. and the remaining 10% between 180° and 200° C. For the purpose of describing the present invention, these requirements will be assumed, although any other percentages and temperature ranges may be set as a standard without departing from the spirit of the invention. The above mentioned requirements may be expressed as follows:

| | °C. |
|---|---|
| Initial boiling point | 30 |
| 10% vaporizes below | 60 |
| 50% vaporizes below | 120 |
| 90% vaporizes below | 180 |
| Final boiling point | 200 |

Broadly, the invention consists in partly distilling a small sample of the distillate from the main fractionation column so that a residue or high boiling fraction remains in the bottom of the test distillation column. This residue is permitted to flow through a device which is responsive to variations in the rate of flow of the high boiling fraction or residue. This device operates a valve in the reflux line leading to the main column so that a variation in the quantity of the residue in the test column causes a change in the rate of reflux in the main column. In this manner it is possible to accurately and automatically control the percentage of a particular component of the desired final product.

In the past the rate of reflux, or reflux ratio, has been controlled by placing a thermostat in the main fractionating column near the point where the particular fraction or cut is removed from the column, said thermostat controlling the reflux valve. This method is adapted to automatically control the temperature of distillation of the cut. However, the quantities of the various components of any particular cut are dependent not only on the temperature in the column but also on the pressure existing at the point where the cut is removed. Even though the temperature may be kept constant, for instance, at the head of the column, the vaporized product issuing from the column will vary if there are variations in the pressure at this point. But variations of the composition may be also caused by many other factors, the most important of which are changes in the composition of the original material introduced into the main fractionation column, variations in the composition of the distillate, variations in operating pressure, etc. According to the present invention the reflux is varied so that the product conforms to certain predetermined values, the temperature at the top of the column being varied so as to uniformly maintain the properties of the distillate.

In particular the process consists in fractionating oil as it comes from stills and then continuously fractionating a small sample portion of a cut, the characteristics of which it is desired to control. The second or test fractionation is carried out at a lower temperature than the main fractionation so that a part of the sample portion will not be distilled. This liquid residue is allowed to run continuously in such a manner that any variation in the quantity of residue per unit of time will cause a variation in the reflux ratio to the main fractionating column. For instance, if the rate of flow of the residue in the test column increases beyond a predetermined value, the reflux in the main column will be increased thereby reducing the temperature at the top of the main column. This reduction of temperature will prevent some of the higher boiling constituents from passing off and thereby reestablish the desired proportion of the higher boiling constituents in the final product.

Referring to the standards described above, let it be assumed that the final product is to consist of a 10% component vaporizing between 180° and 200° C. In this case the temperature at the bottom of the test column is maintained at say 180° C. so that all constituents boiling below 180° C. will be vaporized. It is presumed that the vapors issuing from the main column do not contain any constituents which boil above 200° C. A sample of the vapors coming from the main column is continuously condensed and then supplied to the test column where the residue (B. P. 180° C. to 200° C.) collects at the bottom. This residue is allowed to flow continuously through a device which will become operative when the flow of residue varies. Obviously this device must be adjusted according to the particular amount of the sample which is employed in the test fractionation. If the amount of residue increases, the device will operate the reflux valve to increase the reflux and thereby decrease the temperature at the top of the main column. This in turn reduces the amount of the component boiling between 180° and 200° C. until the proper proportion has been reestablished. Alternately if the amount of residue decreases the reflux ratio is decreased so that the temperature at the top of the main column is increased and consequently the proportion of the high boiling component in question increases. Obviously, if it is desired to control the 50% residue which boils between 120° and 200° C. it is only necessary to adjust the temperature at the bottom of the test column and to make corresponding adjustments in the valve operating device.

In order to more clearly describe the invention reference is made to the accompanying drawing which constitutes a diagrammatic illustration of one arrangement for carrying out the process.

In the drawing, 1 is the main fractionating column into which the oil or other liquid mixture partly vaporized is fed at 2. The vapors are led off at 3 and passed through a condenser 4. The resulting liquid passes into a separator or settling tank 5 from which the final pure fraction is taken off at 6. Any water which separates out is taken off at 7 and the uncondensable vapors at 8. Some of the final product is permitted to flow over the plate 5′ into a chamber from which it is drawn by pump 9 into the reflux pipe 10. Interposed in this pipe is a reflux control valve 11 which controls the amount of liquid returned to the main fractionating column. The valve 11 is controlled as hereinafter described.

A small portion of the vapors passing through pipe 3 is allowed to pass through the valve 12 and pipe 13 to the condenser 14. The resulting liquid will be termed the test liquid. From the condenser 14 the test liquid passes through a separator or settling tank 15 which like the tank 5, permits removal of water at 16 and uncondensable vapors at 17. 18 is an overflow pipe.

The test liquid then passes through a flowmeter 19 into the test distillation column 20. This column may be of the bubble-plate type and is heated by resistances or heating elements 21, 22, 23 and 24, which are controlled by a circuit breaker 25. A thermocouple device 26 controlled by the temperature in the bottom of the test column 20 operates the circuit breaker 25. At the bottom of the column 20 the heating element 21 is maintained at a predetermined temperature lower than the final boiling point of the test liquid being distilled. The residue which collects at the bottom of the column 20 passes through a device which measures the rate of flow. This device, in turn, controls the reflux valve 11. For the purposes of the present invention, any type of valve operating device responsive to liquid flow may be used, but the device shown in the drawing will be described in detail.

The residue leaves the test column 20 through the pipe 27 and then passes through a cooler 28 so that the liquid will have a definite and uniform temperature when it passes through the valve operating device. After being cooled to a definite temperature the liquid passes through the double syphon 29 and 30 into the tube 31. The tube 31 has a variable outlet 32 through which the liquid passes. A float 33 is arranged within the tube 31 which is adapted to rise or fall within the tube according to whether the liquid rate of flow increases or decreases. On the float 33 a rod 34 is mounted which rises and falls with the float. The movement of the rod is utilized to operate the reflux valve 11 and this may be accomplished either by mechanical, electrical or pneumatic means or a combination of these. The rod 34 may also be used to operate an indicator which is calibrated to show the change in rate of flow, the proportion of undistilled test liquid to the whole sample or any other characteristic. The indications may then be used as a guide for changing the flow through the reflux valve 11.

In the modification shown in the drawing, the rod 34 is provided with a rack at its upper end cooperating with a pinion 35. This pinion operates an escape-valve 36 which controls the amount of compressed air acting on the valve 11 through the pipe 37. A source of compressed air is indicated at 38. It therefore follows that a variation in the amount of residual liquid in the test column 20 will re reflected through the valve control device to the valve 11. It is clear that a direct mechanical connection between the rod 34 and the valve 11 may be used if the arrangement of the apparatus at the distilling plant is suitable.

In order that the operation of the test column be as accurate and uniform as possible, it is necessary to eliminate variations of all factors which may influence the test distillation. It is therefore essential to maintain a constant and uniform flow of the test liquid through the flow meter 19, a constant pressure within the column 20 and a constant temperature. To accomplish this, the vapors issuing from the test column 20 are passed through a condenser 39 and pipe 40 into the vessel 41 which is kept at a constant pressure. The uncondensed vapors which are passed through the pipe 17 are led into the vessel 41. The pressure in the vessel 41 is transmitted through the pipe 42 and controls the valve 43. This valve permits excess vapors in pipe 17 to be exhausted through the pipe 44.

If for instance, the pressure in the main column 1 increases, this increase is transmitted through valve 12, pipe 13, tank 15, pipe 17 to the vessel 41. The valve 43 is then opened until the desired pressure in pipe 17 and tank 15 is reestablished. By maintaining a constant pressure on the liquid in tank 15 a constant and uniform flow into the test column 20 is assured. This in turn ensures a constant and uniform operation in the test column 20 which is essential to a correct and accurate operation of the means controlling the reflux valve 11.

It will be clear from the foregoing that various modifications may be employed without departing from the spirit of the present invention.

Having now described my invention, what I claim is:

1. A method for controlling the boiling point range of the product of a fractionation column having a reflux comprising continuously separating a sample portion from the distilled product as it comes from the column, continuously distilling the sample at a temperature below its final boiling point, measuring the rate of flow of the residue of the sample, and automatically using variations in said rate of flow to vary the reflux ratio whereby the boiling point range of the product may be controlled.

2. A method as claimed in claim 1 wherein the step of distilling the sample is carried out at constant temperature and pressure.

3. The method of controlling the boiling point range of the distillate from a fractionating column provided with a reflux return, which comprises passing a portion of the distillate to a distillation zone and distilling off the bulk of said portion leaving a high boiling residue, measuring the quantity of said residue obtained per unit of time and automatically controlling the rate of flow of said reflux in direct proportion to said measurements in such manner as to maintain constant the proportion of said high boiling residue in said distillate.

4. The method of controlling the boiling point range of the distillate from a fractionating column provided with a reflux return, which comprises passing a portion of said distillate to a distillation zone and distilling off the bulk of said portion at constant pressure leaving a high boiling residue, passing said residue through a flow meter and automatically controlling the rate of flow of said reflux by means of a control actuated by said flow meter, in such manner that the reflux is varied in direct proportion to the flow of said residue through said meter.

5. An apparatus for producing a distillate of constant boiling point range which comprises in combination a fractionating column and a test still, means for passing a complex liquid composed of components of varying boiling points into said column, means for maintaining at least the lower end of said column at a temperature sufficiently high to produce a desired distillate, means for drawing off and condensing vapors produced in said column from the upper end thereof, reflux means including a control valve for returning a controlled portion of the condensate to the top of said column, means for passing another portion of said condensate to said test still, means for heating said test still to a temperature sufficient to distill off the bulk of said portion leaving a high boiling residue, a flow meter, means for passing said residue through said flow meter and control means actuated by said flow meter for automatically setting said control valve in accordance with the flow of said residue through said flow meter, whereby the proportion of said residue in said flow meter is maintained constant.

6. An apparatus for producing a distillate of constant boiling point range which comprises in combination a fractionating column and a test still, means for passing a complex liquid composed of components of varying boiling points into said column, means for maintaining at least the lower end of said column at a temperature sufficiently high to produce a desired distillate, means for drawing off and condensing vapors produced in said column from the upper end thereof, reflux means including a control valve for returning a controlled portion of the condensate to the top of said column, means for passing another portion of said condensate to said test still, means for heating said test still to a temperature sufficient to distill off the bulk of said portion leaving a high boiling residue, means for holding a constant pressure in said test still, a flow meter, means for passing said residue through said flow meter and control means actuated by said flow meter for automatically setting said control valve in accordance with the flow of said residue through said flow meter, whereby the proportion of said residue in said flow meter is maintained constant.

ALFRED SAMUEL WOLFNER.